United States Patent [19]

Nakajima

[11] Patent Number: 4,676,103

[45] Date of Patent: Jun. 30, 1987

[54] ACCELERATION OR INCLINATION SENSORS

[75] Inventor: Nobuyuki Nakajima, Higashi-Matsuyama, Japan

[73] Assignee: Diesel Kiki Co., Ltd., Tokyo, Japan

[21] Appl. No.: 808,245

[22] Filed: Dec. 12, 1985

[51] Int. Cl.$^4$ ..................... G01P 15/125; G01C 9/18
[52] U.S. Cl. ................... 73/516 LM; 33/366; 33/377
[58] Field of Search ............ 73/516 LM; 33/366, 377; 361/280

[56] References Cited

U.S. PATENT DOCUMENTS

| | | | |
|---|---|---|---|
| 3,176,520 | 4/1965 | Aske. | |
| 3,252,333 | 5/1966 | Lunde | 73/516 LM |
| 3,516,294 | 6/1970 | Schmieder | 73/516 LM |
| 3,839,904 | 10/1974 | Stripling et al. | 73/516 LM |
| 4,043,204 | 8/1977 | Hunter et al. | 73/517 B |
| 4,528,851 | 7/1985 | Ozols | 73/516 LM |

FOREIGN PATENT DOCUMENTS 2551798  5/1976  Fed. Rep. of Germany.

Primary Examiner—Stewart J. Levy
Assistant Examiner—John E. Chapman, Jr.
Attorney, Agent, or Firm—Wenderoth, Lind & Ponack

[57] ABSTRACT

An acceleration or inclination sensor includes at least two condensers formed as a reference electrode and a detection electrode divided into at least two portions. A magnetic fluid is provided between the reference and detection electrodes, and a magnet or electromagnet is provided for generating magnetism acting upon the magnetic fluid around the location at which the detection electrode is divided, whereby acceleration or inclination is detected by a change in the capacitance of the condensers in terms of an electrical signal.

6 Claims, 8 Drawing Figures

ACCELERATION OR INCLINATION SENSORS

BACKGROUND OF THE INVENTION

1. Field of the Invention

The present invention relates to a sensor for detecting the acceleration or inclination of a moving body such as an automobile.

2. Prior Art

One of such sensors is disclosed in Japanese Patent Application Laid-open No. SHO 57(1982)-72067. According to the teachings therein, a soft magnetic material of a noncrystalline metal is joined to an elastic material, and a weight is attached to one end of the elastic material to form a core, which is fixedly provided at the other end within a hollow casing. When it is accelerated, the soft magnetic material with the elastic is distorted. The amount of distortion is then detected by an electrical coil to measure the acceleration in terms of an electrical signal.

However, the prior art system as mentioned above, wherein acceleration is detected in terms of the amount of the elastic material forming a part of the core, has problems in that a decrease in the length of the elastic material leads to a decrease in the size of the system but also to a drop in the sensitivity thereof, while an increase in the length of the elastic material results in improvements in the sensitivity of the system but an increase in the size thereof.

SUMMARY OF THE INVENTION

It is therefore a primary object of the present invention to provide a small-sized, light-weight and highly-sensitive acceleration or inclination sensor.

According to the present invention, this object is achieved by the provision of an acceleration or inclination sensor comprising in combination;

at least two condensers each formed as a flat-plate reference electrode and a flat-plate detector arranged opposite to said reference electrode, which is divided into two portions;

a magnetic fluid between the reference and detection electrodes of said condensers for movement therebetween; and a magnetism-generating means for generating magnetism acting upon said magnetic fluid around the portion by which said detection electrode is divided, whereby acceleration is detected by a change in the capacities in terms of an electrical signal.

According to the arrangement as contemplated in the present invention, when subjected to acceleration or tilting, the magnetic fluid moves under the force of inertia produced therefrom against a returning force in association with a magnetic force produced by the magnetism-generating means. Movement of the magnetic fluid gives rises to a change in the capacities of the condensers defined by the reference and detection electrodes, which is used to produce acceleration or tilting. The magnetic fluid moves so sharply in response to a change in acceleration or inclination that the sensor can be made small in size, light in weight and improved in terms of sensitivity.

Many other advantages, and additional objects of present invention will become manifest to those versed in the art upon making reference to the detailed description and the accompanying sheets of drawing in which preferred embodiments incorporating the principles of the present invention are shown by way of illustrative example.

DETAILED DESCRIPTION OF THE PREFERRED EMBODIMENTS

Figure 1:
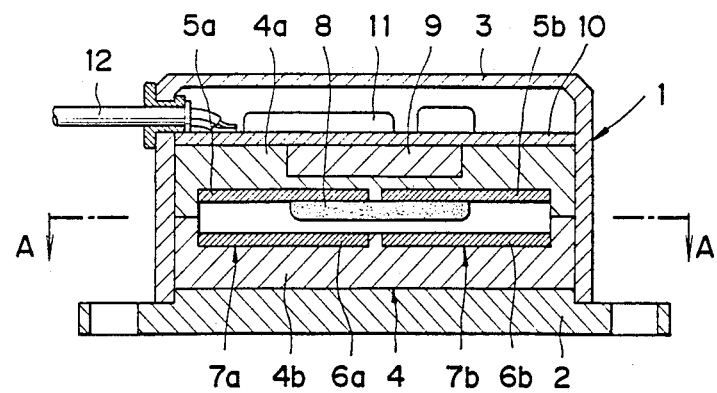
FIG. 1 is a longitudinal sectional view of a first embodiment of the acceleration or inclination sensor of the present invention.
Figure 2:
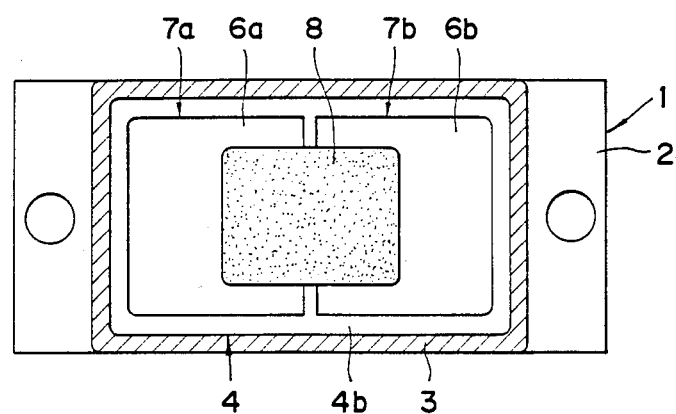
FIG. 2 is a sectional view taken along the line A—A of FIG. 1

Referring first to FIGS. 1 and 2, there is shown a first embodiment of the present invention, wherein a housing 1 is secured to a support member 2 with a lid member 3, and receives therein a vessel 4 comprising a nonmagnetic material. The vessel 4 is hollow, and includes vessel members 4a and 4b having airtight openings facing each other. Two reference electrodes 5a, 5b and two detection electrodes 6a, 6b are opposite to each other, and are fixed to the inner lower and upper faces of the upper and lower members 4a and 4b, respectively.

The reference electrodes 5a, 5b and the detection electrodes 6a, 6b are formed of rectangular flat plates, which are divided at the central portion of the vessel 4 into two condensers 7a and 7b. Betweeen the reference electrodes 6a, 6b forming the condensers 7a and 7b, respectively, there is a magnetic fluid 8 to be described later, which is movable in the direction of acceleration.

As well-known in the art, the magnetic fluid 8 is a colloidal liquid obtained by dispersing a high concentration of a magnetic particles of $Fe_3O_4$ having a diameter of, e.g., about 100 A in various solvents such as water or oil. Without any settling or coagulation of the magnetic particles even in the presence of a magnetic field, the liquid behaves as if it is magnetic. Upon receiving a horizontal force of inertia produced by acceleration or tilting of a moving body to which the sensor of the present invention is attached, the magnetic field 8 moves to vary the dielectric constants, viz., capacities of the condensers 7a and 7b.

In the vicinity of the upper middle portion of the upper vessel member 4a, there is fixed a magnetism-generating means 9 comprising a rectangular permanent magnet or electromagnet for the purpose of allowing the magnetic fluid 8 to collect in a space through which the condensers 7a and 7b are separated from each other. Within the housing 1 and above the vessel 4, there is arranged a wiring substrate 10 of an electronic circuit to which an electronic circuit part 11 and a output lead 12 are connected to convert change in the capacitance of the condensers 7a and 7b into electrical signals (e.g., voltages), which are in turn transmitted by the lead 12.

According to the foregoing arrangement, the magnetic fluid 8 is caused to collect in the vicinity of the middle portion of the vessel by the magnetism-generating means 9 in the absence of any acceleration or tilting, so that the output from the output lead 12 is zero. For instance, assuming acceleration is applied in the left-hand direction in FIG. 1, a magnetic fluid 8 receives the force of inertia acting in the right-hand direction counter to the acceleration direction, so that it moves in the right-hand direction against the magnetic force produced by the means 9. Now assuming the capacitance of the condensers 7a and 7b are indicated by $C_1$ and $C_2$, respectively, their dielectric constants vary, resulting in $C_1 > C_2$. This makes it possible to detect the direction of acceleration by comparing the magnitudes of $C_1$ and $C_2$. It is also possible to calculate the magnitude of acceleration from $C = C_1 - C_2$.

Figure 3:
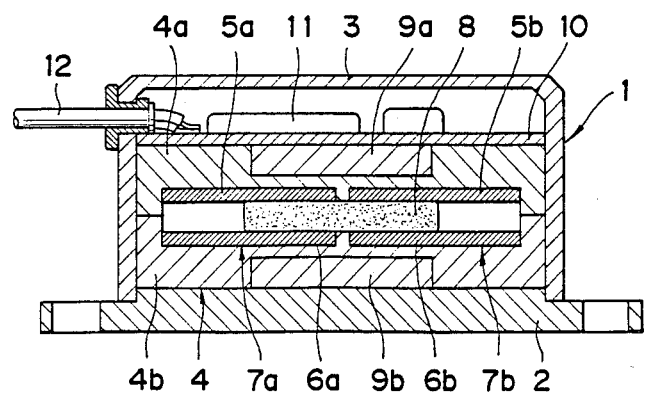
FIG. 3 is a longitudinal sectional view of a second embodiment of the acceleration or inclination sensor of the present invention.
Figure 4:
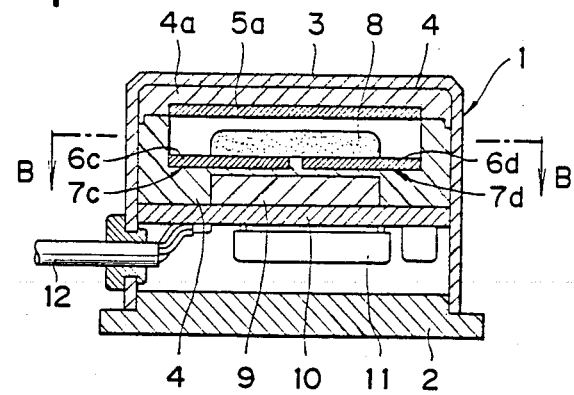
FIG. 4 is a longitudinal sectional view of a third embodiment of the acceleration or inclination sensor of the present invention.
Figure 5:
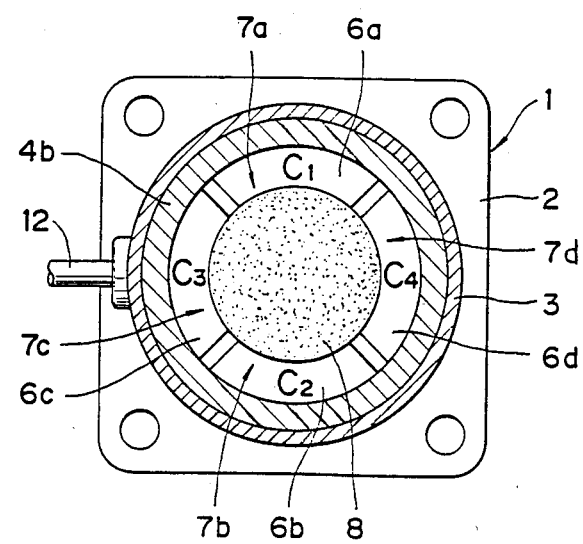
FIG. 5 is a sectional view taken along the line B—B of FIGS. 4, and FIGS. 6 to 8 are respectively schematical views illustrative of the movement of the magnetic fluid upon receiving acceleration or tilting in various directions.
Figure 6:
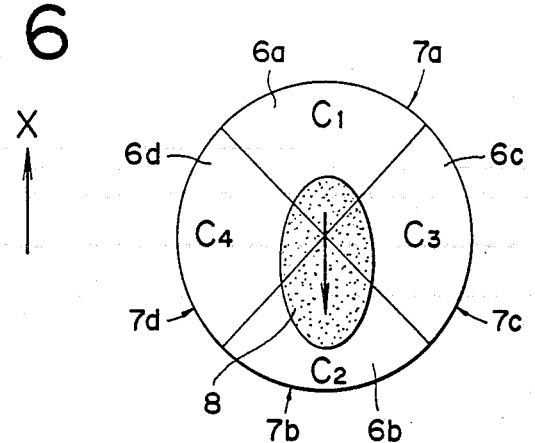
Figure 7:
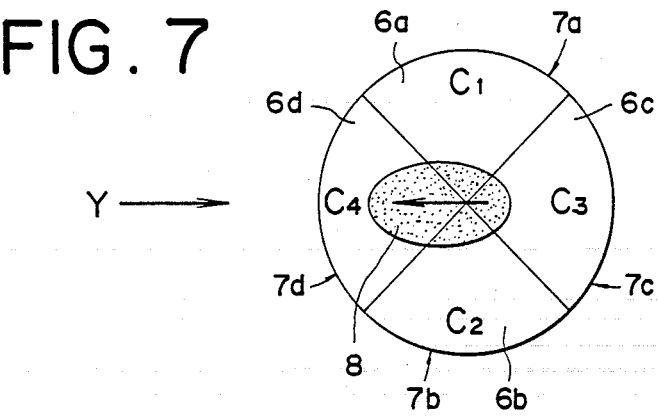
Figure 8:
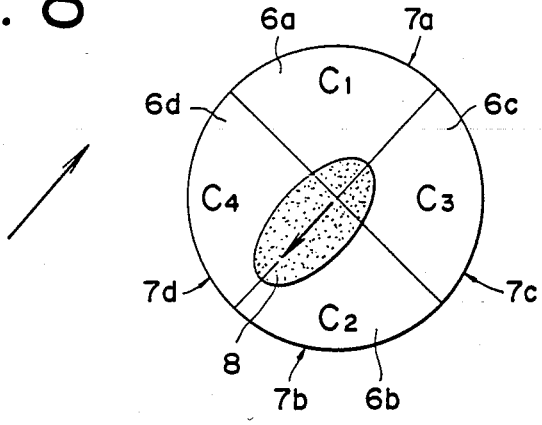

FIG. 3 shows the second embodiment of the present invention, which is similar to the first embodiment, except that magnetism-generating means 9 is disposed on the upper and lower portions of the vessel 4. For the purpose of simplification, like parts are indicated by like numerals in FIG. 3.

Referring to FIGS. 4 to 8 inclusive, there is illustrated the third embodiment of the present invention. Unlike the foregoing two embodiments designed to detect acceleration or inclination in a single direction, the third embodiment is adapted to detect acceleration or inclination in both X and Y directions. Like parts used in the 1st and 2nd embodiments are indicated by like numerals for the purpose of omission of the explanation thereof.

More specifically, a housing 1 includes a cylindrical lid member 2, within which a vessel 4, again cylindrical in form, is arranged.

An upper vessel member 4a forming a part of the vessel 4 is fixedly provided on the inner lower face with a reference electrode 5a, and lower vessel member 4b is fixedly provided on the inner upper face with detection electrodes 6a to 6d opposite from the reference electrode 5a. The reference electrode 5a, in a disc form, provides a common electrode with respect to the detection electrodes 6a to 6d facing it, and the detection electrodes 6a to 6d extend radially from the center of the vessel 4, thus defining four condensers 7a to 7d. A magnetic fluid 8 is provided between the reference electrode 5a and the detection electrodes 6a to 6d, which define the condensers 7a to 7d, and is forced to collect in a circle in the vicinity of the center of the vessel 4 by a circular magnetism-generating means 9.

Hence, when acceleration is applied in the X, Y or 45° direction, for instance, the magnetic fluid 8 receives the force of inertia in the direction counter to the direction of acceleration, and moves in an oval form which results in variations in the capacities $C_1$ to $C_4$ of the condensers 7a to 7d. Now, since $C_3 = C_4$, $C_1 < C_2$ when acceleration acts in the X direction, $C_1 = C_2$ and $C_3 < C_4$ when acceleration acts in the Y direction, and $C_1 = C_3$ and $C_2 = C_4$ when acceleration acts in the 45° direction, the direction of acceleration can be detected by comparison of the capacitance $C_1$ to $C_4$. It is also possible to calculate the magnitudes C of acceleration in the respective directions from $C = C_1 - C_2$, $C = C_3 - C_4$ and $C = C_4 - C_1 = C_2 - C_3$.

It is to be appreciated that while four condensers have been used in the 3rd embodiment, it is possible to detect acceleration in the X and Y direction, given at least three condensers, and the detection electrodes used may be in various forms such as rectangles or triangles.

It is also to be appreciated that the magnetic fluid has been described as being in direct contact with electrodes of the condensers in the foregoing embodiments; however, a material such as that commercially available under the trade name of Teflon may be coated on the surfaces of the electrodes to prevent oxidation thereof and improve the flow of the magnetic fluid.

As explained above, it is possible, according to the present invention, to provide a small-sized, light-weight and highly sensitive acceleration sensor, since the moving portion upon being accelerated, of the sensor is formed of a magnetic fluid, and the position of that fluid is converted into the capacitance of flat condensers to detect acceleration by a change in the capacitance of the condensers. According to the present invention, any mechanical support mechanism is also dispensed with by constructing the moving portion from magnetic fluid, thus leading to improvements in durability, reliability and the like.

It should be noted that the acceleration sensor of the present invention can also be used as an inclination sensor. In other words, tilting of the acceleration sensor causes the acceleration of gravity to act upon the magnetic fluid, so that the capacitance of the condensers vary. It is thus possible to measure the angle of inclination of a device to which the acceleration sensor is attached.

Obviously, many modifications and variations of the present invention are possible in the light of the above teachings. It is therefore to be understood that within the scope of the appended claims, the invention may be practiced otherwise than as specifically described.

What is claimed is:

1. A sensor for sensing the acceleration or inclination of a body to which the sensor is attached, said sensor comprising:
   a flat plate reference electrode;
   a flat plate detection electrode opposite said reference electrode and extending in a plane spaced from and parallel to said reference electrode, said detection electrode comprising at least three separate flat plate detection electrode portions each of which cooperates with said reference electrode to act as a condenser therewith whereby at least three condensers are provided, said at least three separate flat plate electrode portions being adjacent one another at a common location on said plane;
   magnetic fluid between said reference electrode and said detection electrode at said common location, said magnetic fluid being flowable between and relative to said reference electrode and said detection electrode when the body is accelerated in any direction parallel to said plane or is inclined to any angle relative to said plane;
   a magnetism-generating means adjacent said condensers for generating a magnetic field acting upon said magnetic fluid to attract said magnetic fluid to said common location and to confine at least a portion of the magnetic fluid thereat,
   whereby when said body accelerates in any direction parallel to said plane or is inclined to any angle relative to said plane said magnetic fluid remains at said common location but elongates in a direction away from said common location thereby producing a relative change in the capacitance of the at least three condensers.

2. A sensor as claimed in claim 1 and further comprising,
   an electronic circuit means electrically connected to said condensers for comparing the capacitance of each of the condensers and for converting results of said comparison into an electronic signal indicative of the acceleration or inclination of the body.

3. A sensor as claimed in claim 1, wherein said reference electrode and said detection electrode are each flat circular plates.

4. A sensor as claimed in claim 1, wherein said reference electrode and said detection electrode each have a coating on their opposing surfaces.

5. A sensor as claimed in claim 1, wherein said magnetism-generating means is a permanent magnet.

6. A sensor as claimed in claim 1, wherein said magnetism-generating means is an electromagnet.

* * * * *